United States Patent
Rischar et al.

(10) Patent No.: US 8,566,561 B2
(45) Date of Patent: Oct. 22, 2013

(54) METHOD TO SEPARATE AND PERSIST STATIC AND DYNAMIC PORTIONS OF A CONTROL APPLICATION

(75) Inventors: Charles M. Rischar, Chardon, OH (US); David A. Johnston, Mentor, OH (US); Bruce J. Moore, Mayfield Heights, OH (US); Eugene M. Liberman, Rocky River, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 589 days.

(21) Appl. No.: 12/780,308

(22) Filed: May 14, 2010

(65) Prior Publication Data

US 2011/0283070 A1 Nov. 17, 2011

(51) Int. Cl.
G06F 12/00 (2006.01)
(52) U.S. Cl.
USPC .................... 711/173; 711/103; 711/E12.002
(58) Field of Classification Search
None
See application file for complete search history.

(56) References Cited

U.S. PATENT DOCUMENTS

| | | | |
|---|---|---|---|
| 4,571,692 A * | 2/1986 | Germer | 702/60 |
| 2003/0055915 A1* | 3/2003 | Ngo | 709/219 |
| 2004/0103238 A1* | 5/2004 | Avraham et al. | 711/102 |
| 2005/0228771 A1* | 10/2005 | Soemo et al. | 707/1 |

* cited by examiner

*Primary Examiner* — Reginald Bragdon
*Assistant Examiner* — Thanh D Vo
(74) *Attorney, Agent, or Firm* — R. Scott Speroff; Boyle Fredrickson, S.C.; John M. Miller (57) ABSTRACT

The subject matter disclosed herein describes a method of allocating and persisting memory in an industrial controller without requiring a battery backup or a large capacitive storage system. Each data object is identified as static or dynamic. Static objects are further classified by whether frequent access of that data object is required. Each of the data objects is stored in non-volatile memory. The dynamic data objects and static data objects requiring frequent access are stored in volatile memory. A record of static data objects is maintained in non-volatile memory and a record of dynamic data objects is maintained in volatile memory. Upon power loss, the present value of each dynamic data object is copied to non-volatile memory. When power is restored, the values of both the dynamic data objects and the static data objects that require frequent access at run-time are copied from non-volatile memory to volatile memory.

19 Claims, 5 Drawing Sheets

METHOD TO SEPARATE AND PERSIST STATIC AND DYNAMIC PORTIONS OF A CONTROL APPLICATION

BACKGROUND OF THE INVENTION

The subject matter disclosed herein relates generally to industrial controllers for controlling industrial processes or machinery, and in particular to a method of allocating and persisting memory in an industrial controller.

Industrial controllers are special purpose computers used for controlling factory automation and the like. The control program executed by the industrial controller is normally highly customized to a particular control application. Special control languages, such as "relay ladder logic" are normally used to facilitate programming of the device. Under the direction of the stored programs, a processor of the industrial controller examines a series of inputs reflecting the status of a controlled process. The control program uses the series of inputs to set or reset internal states within the processor. The combination of inputs and internal states are used to set outputs affecting the controlled process.

Industrial controllers often operate in environments where unexpected power interruptions may occur. For example, an operator or maintenance personnel may enter a restricted area or the controlled process, or another controlled process operating nearby may experience a fault condition, resulting in the power being removed from the controller. However, a power interruption may result in significant costs associated with lost production or potential complications of resetting a process. Consequently, the ability of the controller to quickly resume control of the process after a power loss can result in significant cost savings.

Developments in Random Access Memory (RAM) have resulted in higher density, lower power memory with an improved performance and reduced cost. As a result, significant increases in storage capacity and reductions in cost of RAM have allowed industrial controllers to exploit algorithms and approaches that utilized greater amounts of memory to improve performance, increase flexibility, and simplify development. However, RAM is primarily volatile memory, retaining its contents only as long as power is applied. In order to quickly resume control of a process after power loss, it is necessary to retain an image of the status of the process prior to losing power. Consequently, it is necessary to develop methods to capture the status of the processor in RAM and store it to non-volatile memory in the event of a power loss.

In order to capture the status of the processor from RAM, data is copied from RAM to non-volatile memory when a power loss is detected. However, only a small amount of time exists during which a processor may copy data to nonvolatile memory between detecting a drop in voltage level indicative of a power loss and when the voltage level becomes too low to write any further data to the non-volatile memory. Consequently, a limited amount of RAM may be transferred to non-volatile memory when power is lost.

Presently, industrial controllers attempt to overcome this limitation either by providing battery back-up to the RAM, such that the image of the controlled process remains in RAM through a power cycle or by providing a battery or capacitive source to temporarily extend the period of time during which the processor may transfer data from RAM to non-volatile memory.

However, battery-backed RAM and battery ride through systems both have drawbacks. Many industrial applications prohibit the use of either battery back-up or battery ride through systems. In addition, the batteries provide extra initial and maintenance expense to the controller. Capacitive storage devices having sufficient capacity to temporarily power the controller also add size and expense to the control system. In addition, controllers are now expected to retain significant amounts of information, including symbolic access to data and historical information, such as alarms, faults, or other events. Controllers also execute increasingly complex algorithms and control programs, requiring an increasing quantity of data to be persisted.

Thus, it would be desirable to offer a method to persist sufficient data in a controller to meet the growing requirements of industrial controllers without the additional size and expense of battery or capacitive storage systems.

BRIEF DESCRIPTION OF THE INVENTION

The subject matter disclosed herein describes a method of allocating and persisting memory in an industrial controller without requiring a battery backup or large capacitive storage system. The present method first places data objects into non-volatile memory. Each data object is identified as a static or dynamic object A static data object is a data object having a value that does not change frequently, and a dynamic data object is a data object having a value that does change frequently. The static objects are further classified by whether frequent access of that data object is required. The dynamic data objects and those static data objects requiring frequent access are stored in volatile memory. When data objects are modified, changes to the static objects are preferably stored directly in non-volatile memory or recorded in a log stored in non-volatile memory. Changes to the dynamic objects are updated directly in volatile memory. If power to the controller is removed, the present value of each dynamic data object is copied to non-volatile memory. When power to the controller is restored, the values of both the dynamic data objects and the static data objects that require frequent access at run-time are copied from non-volatile memory to volatile memory.

According to one embodiment of the present invention, a method of retaining a plurality of data objects in memory in an industrial controller having both a volatile memory and a non-volatile memory classifies each of the data objects as a static data object or a dynamic object. Each static data object is changed at a frequency less than a preselected threshold frequency and each dynamic object is changed at a frequency greater than a preselected threshold frequency. Optionally, a data object may have at least a first and a second data element, wherein the first data element is classified as a static data object and the second data element is classified as a dynamic data object. Each of the static data objects is stored in non-volatile memory, and each dynamic data object and at least a portion of the static data objects are stored in volatile memory. When each dynamic data object changes, the dynamic data object is updated in the volatile memory. For the portion of static data objects stored in volatile memory, changes of the static data objects are tracked and updated in the volatile memory when the static data object changes. The present value of each dynamic object in the volatile memory is copied to the non-volatile memory when power is removed from the controller.

Thus, it is a feature of the present invention that the data objects are classified as static or dynamic to identify data objects as either frequently or infrequently changed at run-time of the controller. The number of data objects to be persisted during a power loss is subsequently minimized by copying only those data objects that are frequently changed at run-time.

As another aspect of the invention, each of the dynamic data objects and the portion of static data objects stored in the volatile memory are copied from the non-volatile memory to the volatile memory when power is restored to the controller. Thus, it is another feature of the present invention that the status of the data objects of the controller may be restored when power is reapplied to the controller.

As another aspect of the invention, tracking the change of the static data objects stored in volatile memory further comprises the step of updating the static data object in the non-volatile memory prior to updating the static data object in the volatile memory. Optionally, tracking the change of the static data objects stored in volatile memory comprises the steps of storing a record of each change into the non-volatile memory and restoring the changes to the static data objects stored in the volatile memory according to the record of changes after the static data objects are copied from the non-volatile memory to the volatile memory when power is restored to the controller.

Thus, it is another feature of the present invention that changes to the static data objects are either recorded in the non-volatile memory as they occur or a record of changes to the static data is kept and the changes are reapplied after reloading the base set of data objects into volatile memory.

As still another object of the present invention, a portion of the non-volatile memory equal to or greater in size than number of dynamic data objects may be reserved. The present value of each dynamic object in the volatile memory is then stored in the reserved portion of the non-volatile memory at a power loss.

Thus, it is another feature of the present invention that the dynamic data objects may be transferred as a block of data to non-volatile memory to facilitate storing the data objects during a power loss.

As yet another aspect of the present invention, a database is embedded in the non-volatile memory device and the embedded database stores the relation between a first address corresponding to each data object in the volatile memory and a second address corresponding to the data object in non-volatile memory. Optionally, the embedded database stores the relation between a name corresponding to each data object in the volatile memory and an address corresponding to the data object in non-volatile memory.

As still another aspect of the invention, the rate at which each dynamic data object and each static data object is updated in memory is monitored. The rate at which each dynamic data object and each static data object is updated in memory is then compared against the threshold frequency, and the data objects are reclassified as either a static data object or a dynamic object according to the comparison of the rate at which each data object is updated versus the threshold frequency.

Thus, it is another feature of the present invention that the allocation of data objects between static and dynamic may be updated as the industrial controller is executing according to the actual usage of each data object.

In another embodiment of the present invention, an industrial control system configured to retain a plurality of data objects in memory at power loss includes a processor executing a control program having a plurality of static data objects and a plurality of dynamic data objects. Each static data object is changed at a frequency less than a preselected threshold frequency and each dynamic object is changed at a frequency greater than a preselected threshold frequency. The industrial control system also includes a non-volatile memory device storing each of the data objects and a volatile memory storing each dynamic data object and at least a portion of the static data objects. At least one routine executing on the processor tracks the change of each static data object and stores the new static data object in the volatile memory when the static data object changes. The routine also monitors a low voltage signal and, if the low voltage signal is active, copies the present value of each dynamic data object from the volatile memory to the non-volatile memory. Additionally, the routine may copy each of the dynamic data objects and the portion of static data objects stored in volatile memory from the non-volatile memory to the volatile memory when power is restored to the processor.

Thus, it is another feature of the present invention that the data objects in an industrial control system are classified as static and dynamic objects to identify those data objects that are frequently changed at run-time of the controller, resulting in a minimum number of data objects to be persisted during a power loss.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
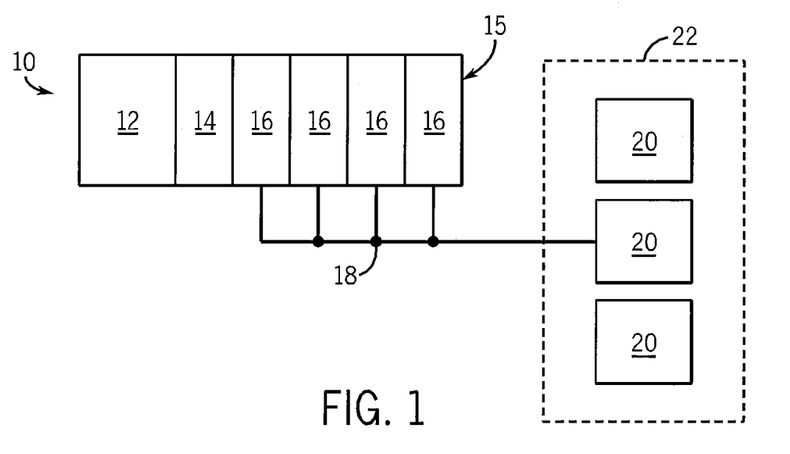
FIG. 1 is a block diagram of an industrial controller incorporating a method of persisting control data according to one embodiment of the present invention.

Referring initially to FIG. 1, an industrial control system 10 incorporating the present invention typically includes a power supply 12, a processor module 14, and multiple I/O modules 16. The I/O modules 16 connect via I/O signal lines 18 to I/O devices 20 in a controlled process 22. As is understood in the art, each of the modules, 14 and 16, may be inserted into a rack 15 and communicate via a backplane 17. It is contemplated that the industrial control system 10 may include many configurations as is known to one skilled in the art. For example, the number of I/O modules 16 used may vary according to the configuration of the control system 10. The I/O modules 16 can be plugged into or removed from the rack 15 for easy expandability and adaptability to configuration changes. Further, the control system 10 may employ either a single or multiple processor modules 14 with either a single or multiple racks 15. The combination of processor modules 14 and racks 15 is defined according to the requirements of the control system 10 and the specific application.

Figure 2:
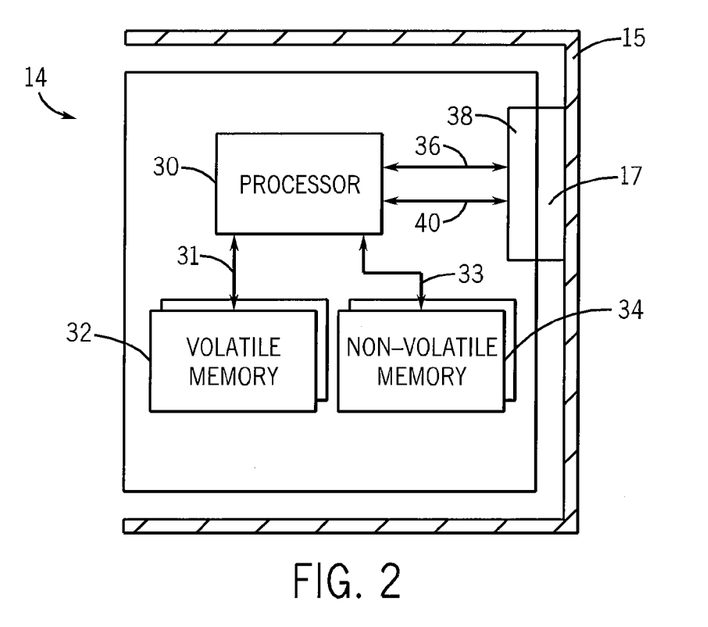
FIG. 2 is a block diagram of a processor module of FIG. 1.
Figure 3:
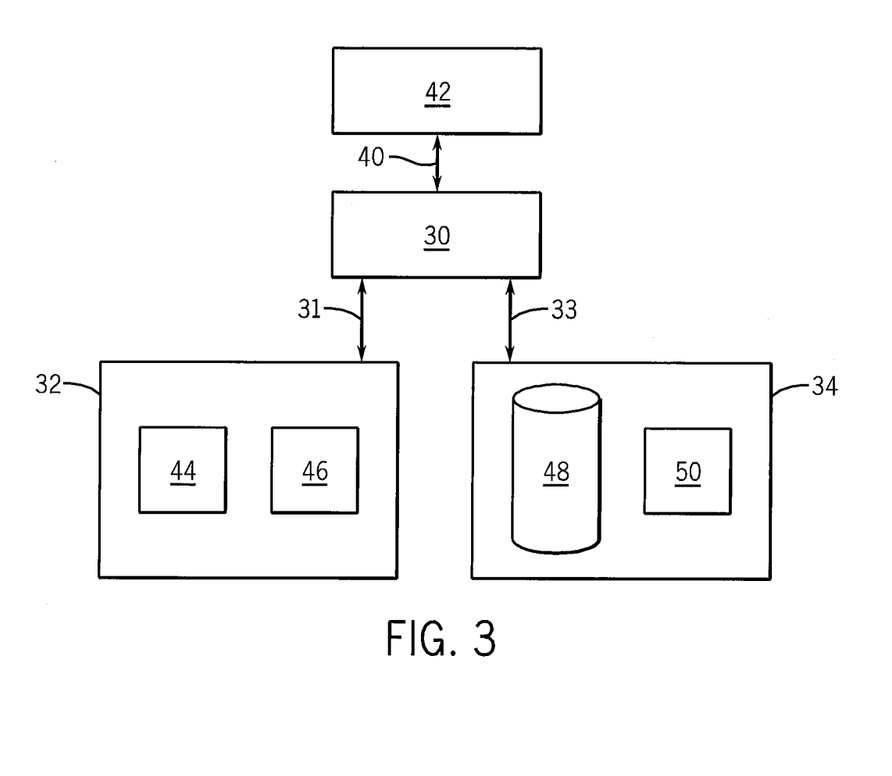
FIG. 3 is a block diagram representation of the interconnections for persisting control data according to one embodiment of the present invention.

Referring next to FIGS. 2 and 3, a single processor embodiment of the present invention is illustrated. The processor module 14 includes a processor 30 configured to execute a program and to communicate with both a volatile memory device 32 and a non-volatile memory device 34. The processor 30 communicates by one or more busses, 31 and 33, between the processor 30 and each of the volatile and non-volatile devices, 32 and 34. The processor module 14 includes a connector 38 to connect the module 14 to the backplane 17. The processor 30 may send or receive signals across the backplane 17, such as I/O signals 36 to and from the I/O modules 16, shown in FIG. 1. In one embodiment, the processor 30 may also communicate via the backplane 17 with external devices over communication lines 40. Optionally, the processor module 14 may include a communication port, not shown, on the module to directly communicate with an external device, such as a programming terminal 42 or other human interface. It is further contemplated, that the processor module may include multiple processors 30 with either a single processor persisting data objects or each processor 30 persisting a portion of the data objects.

The memory on each of the volatile and non-volatile devices, 32 and 34, may be allocated, or partitioned, to define storage locations for data objects used by the program executing on the processor 30. Preferably, the volatile memory device 32 includes a first segment 44 of memory to store dynamic data objects and a second segment 46 of memory to store static data objects. The non-volatile memory device 34 includes at least a first segment 48 to store data objects. The first segment 48 may store both static and dynamic data objects or, alternately, the first segment 48 may store only static data objects. An optional second segment 50 may be provided to store dynamic data objects. It is further contemplated that any of the memory segments, 44, 46, 48, or 50, may either be a single continuous range of memory addresses or be multiple ranges of memory addresses. Further, each memory segment, 44, 46, 48, or 50, may be implemented using either a single, or multiple, memory device, 32 or 34.

In operation, the processor 30 executes a stored program to control an industrial process 22. The program includes data objects describing, for example, input signals, output signals, parameter settings, timer values, intermediate signals, and other internal states. The control system 10 may also include data objects not required for execution of the program such as user or maintenance manuals or data sheets stored in memory. The number and nature of the data objects in a program is dependent on the process 22 being controlled and the quantity of memory available in the control system 10. Typically, the program is developed on a programming terminal 42 and transmitted to the processor 30. Similarly, the program may be developed or edited using any other suitable human-machine interface (HMI) device. As a program is developed or edited, data objects are identified as static or dynamic as indicated at step 100 in FIG. 4. A static data object is a data object that is written to at a rate below a predetermined threshold. A dynamic data object is a data object that is written to at a rate above a predetermined threshold. The predetermined threshold may be a fixed threshold based on, for example, a specific number of writes per shift or during a given time interval and may vary according to the process 22 being controlled. Optionally, the predetermined threshold may be dependent on the specifications of the control system 10, including but not limited to, the clock frequency of the processor, the bandwidth of the data bus, 31 or 33, the speed at which the non-volatile memory may be written, and the rate at which the supply voltage decays upon power loss.

Figure 4:
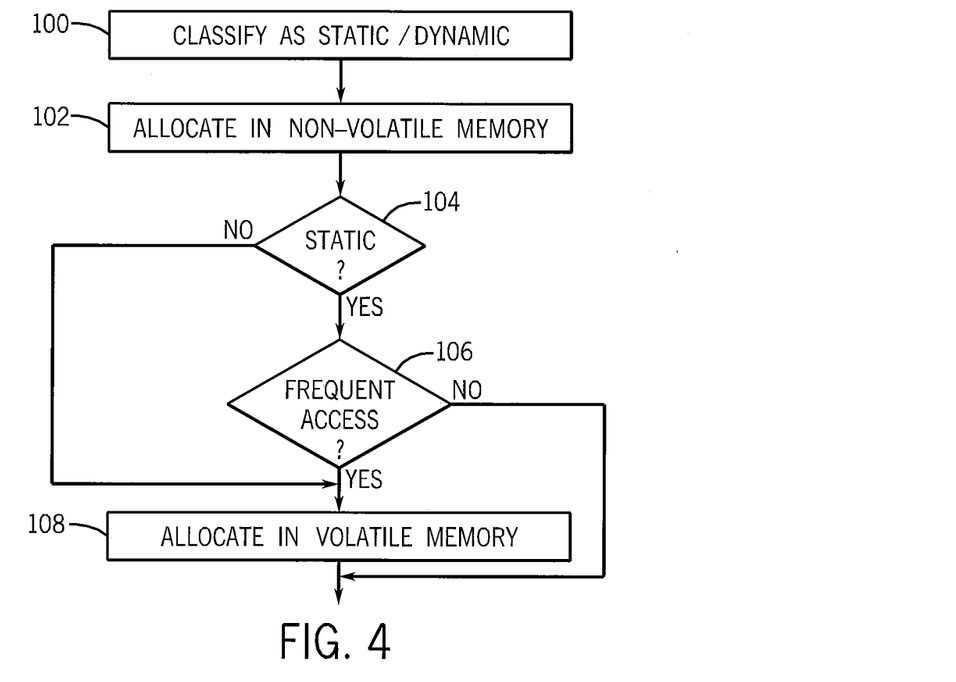
FIG. 4 is a flowchart illustrating the process of initially loading data objects into memory.

After classifying the data objects as static or dynamic, memory for the data objects is allocated within the control system 10. At step 102, addresses for each of the static data objects are allocated in non-volatile memory 34. Similarly, addresses for each of the dynamic data objects may be allocated in non-volatile memory 34. Alternately, a block of addresses may be allocated in the non-volatile memory 34 of sufficient length to store all of the dynamic data objects. At steps 104 and 106, a determination is made if each static data object must be frequently accessed. For example, a parameter of the control system 10 may initially be set and subsequently vary infrequently or not at all, resulting in designation as a static data object. However, the value of the parameter may require frequent read access by the program executing on the processor 30 to control the controlled process 22. Because volatile memory 32 can typically be accessed, or read from, at a faster rate than non-volatile memory 34 it is desirable to access the data object from volatile memory 32. At step 108, memory addresses for both dynamic data objects and those static data objects requiring frequent access are allocated in the volatile memory 32. The volatile memory address for data objects allocated to both volatile and non-volatile memory is preferably stored in non-volatile memory along with the corresponding data object.

Figure 5:
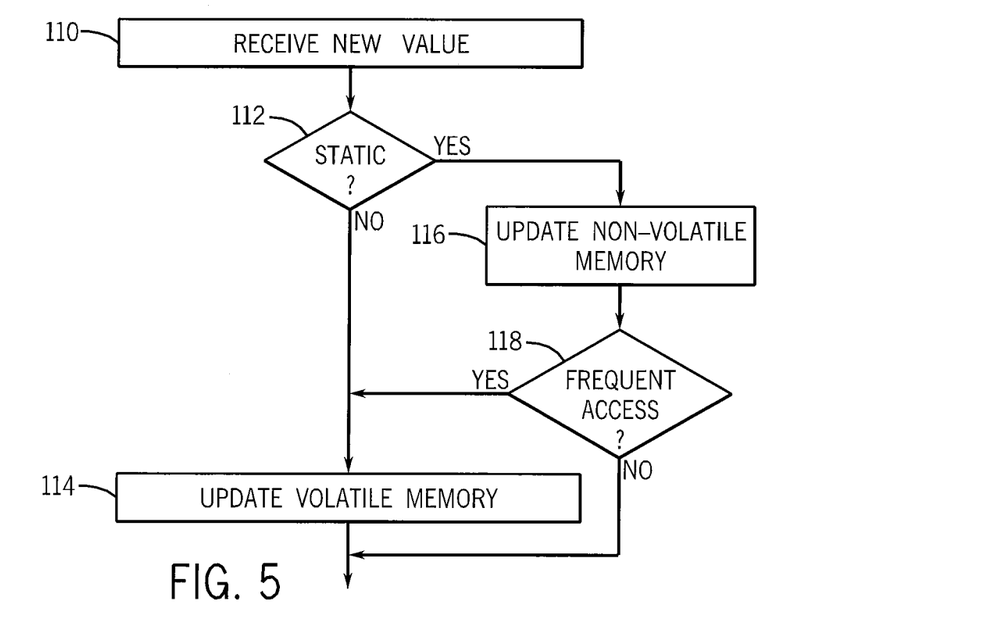
FIG. 5 is a flowchart illustrating changing the value of a data object.

Referring to FIG. 5, changes in the value of both the static and dynamic data objects are managed during run-time. At step 110, the value of one of the data objects changes and is received by a routine executing on the processor 30. In step 112, the routine checks if the data object is static or dynamic, as previously determined according to step 100 in FIG. 4. If the object is static, the routine checks whether the object requires frequent access as shown in step 118.

If the data object is a dynamic data object, the new value is updated in volatile memory 32, shown at step 114. If the data object is static, the change is tracked and updated in non-volatile memory 34 as discussed in more detail below. If the static data object requires frequent access, the new value is also updated in the volatile memory 32, as shown by steps 114-118.

Changes in the values of static data objects are first updated or tracked in non-volatile memory 34 and then updated in volatile memory 32 as needed. According to one embodiment of the invention, any change made to a static data object is first updated directly in the non-volatile memory 34. If the data object has also been allocated to volatile memory 32, the processor 30 subsequently copies the new value of the object to volatile memory 32. According to another embodiment, the processor 30 creates a record of changes made to the static data objects and stores the record of changes in non-volatile memory 34. As a result, either the static data object or a record of the change to the static data objects is saved in non-volatile memory 34 such that the current state of static data objects are already present in non-volatile memory 34 if a power loss occurs.

Figure 6:
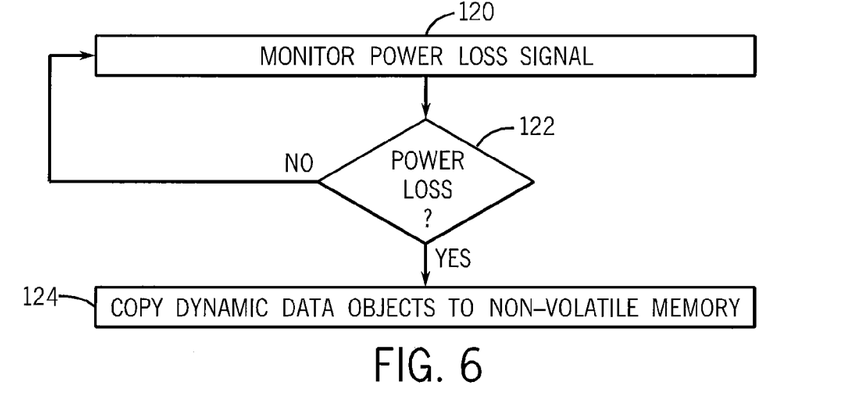
FIG. 6 is a flowchart illustrating persisting data objects at a power loss on the controller.

At step 120 of FIG. 6, a routine executing on the processor 30 monitors a power loss signal input to the processor 30. The control voltage supplied to the control system 10 is monitored, for example, by external circuitry or internally by a routine executing on the processor 30, to generate a power loss signal. If the power loss signal indicates that the voltage is being removed from the control system 10, the present value of the dynamic data objects are copied from the volatile memory 32 to the non-volatile memory 34. Each dynamic data object may be copied to a corresponding memory address previously allocated in the non-volatile memory 34 or, optionally, a block transfer of portions or the entire set of dynamic data objects may be transferred to a corresponding block of addresses allocated in the non-volatile memory 34. Because changes to the static data objects have been either stored in or tracked and stored in the non-volatile memory 34 as the changes occur, there is no need to copy static data objects at power loss.

Figure 7:
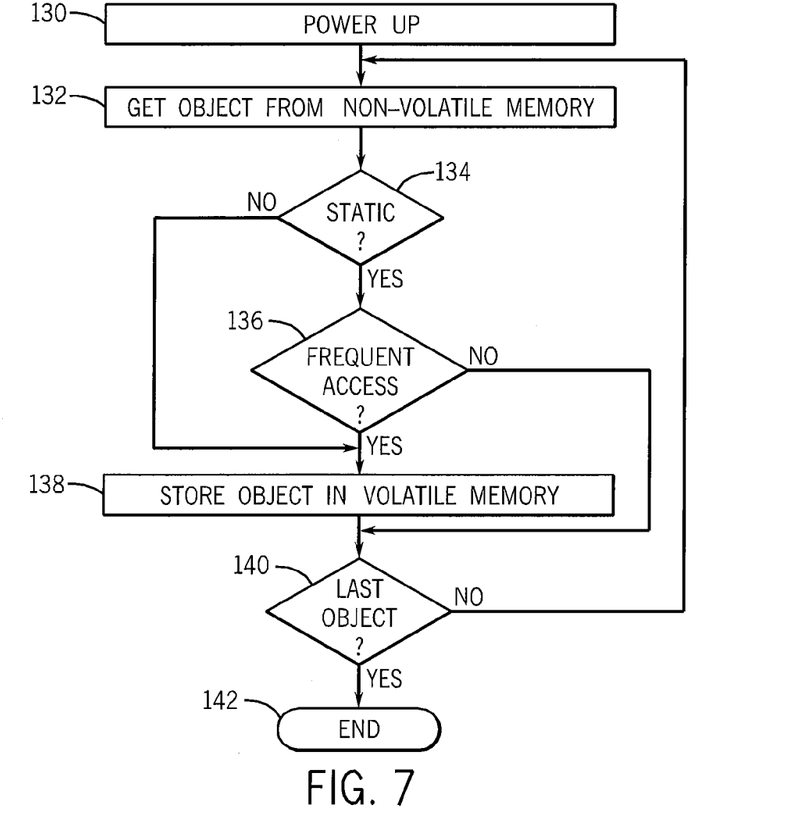
FIG. 7 is a flowchart illustrating restoring data objects when power is restored to the controller.

When power is restored to the control system 10 at step 130 of FIG. 7, the value of each of the dynamic data objects and of the static data objects allocated to volatile memory that existed in the data object prior to losing power must be restored to the corresponding address in volatile memory. At step 132, a routine executing on the processor 30 retrieves the data objects from non-volatile memory 34. The routine determines whether each data object is static or dynamic and whether the static data objects are frequently accessed as shown in steps 134 and 136. The values of each of the dynamic data objects and each of the static data objects that are frequently accessed are restored from the non-volatile memory 34 to the volatile memory 32.

According to one embodiment of the present invention, the changes to static data objects may be tracked by establishing a base image of the static data objects in non-volatile memory 34 and recording a log, or a journal, of each of the new values for the static data objects as the static data object is changed. The log is maintained in non-volatile memory 34 such that the log need not be persisted at power loss. The base image initially includes predetermined default values for each of the static data objects. As new values for static data objects are received, an identifier of which data object changed, such as a memory address, programming label, or other suitable identifier, and the new value of the static data object are recorded in the log or journal. Optionally, the command sent to the controller to initiate the change in the static data object may similarly be recorded in the log or journal.

Figure 8:
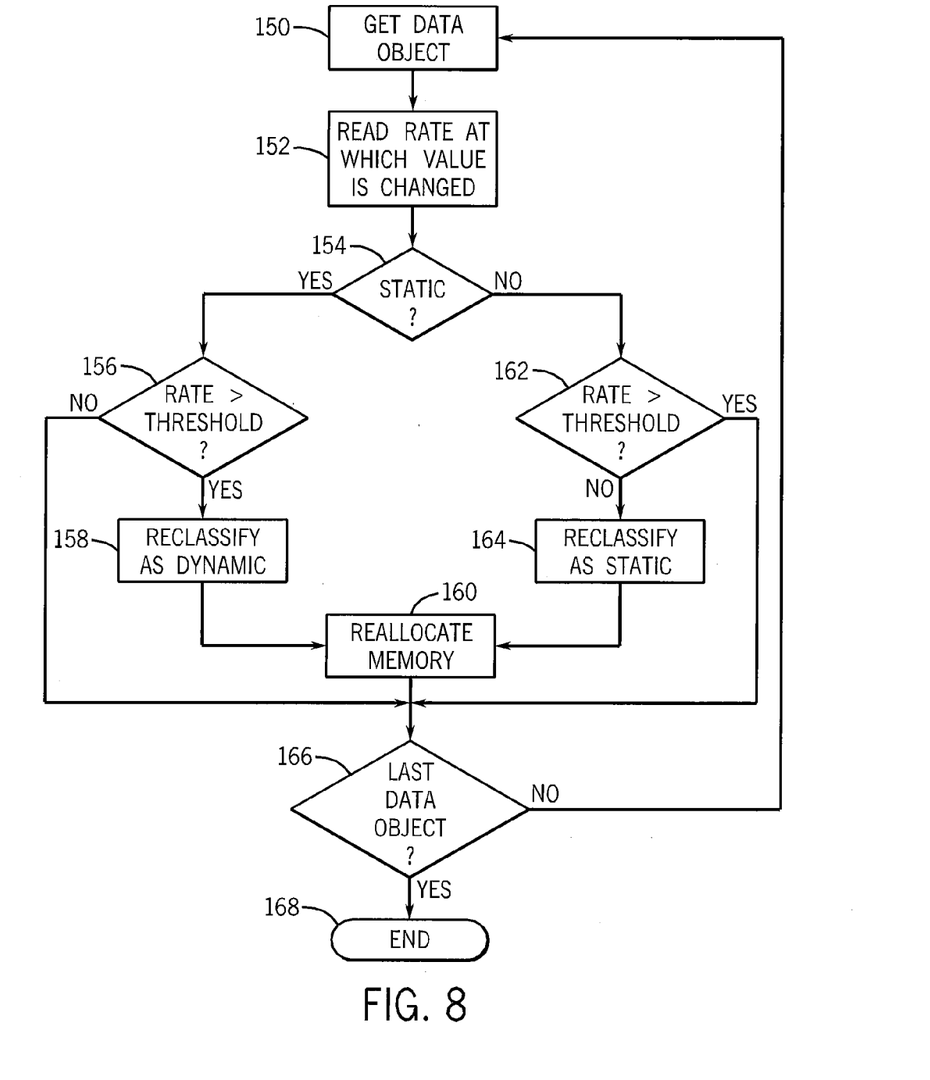
FIG. 8 is a flowchart illustrating dynamic allocation of data objects as static or dynamic.

Referring next to FIG. 8, a routine executing on the processor 30 may reallocate data objects as either static or dynamic according to the frequency at which the data object changes. At step 150, one of the data objects is identified by, for example, a pointer to the memory address of the data object or by reading the value of the data object. The rate at which the data object has been changed is read from memory at step 152. Optionally, the routine for reallocating data objects may determine the rate at which the data object is changing.

At step 154, the routine determines whether the data object was previously allocated as a static or dynamic data object. If the data object was previously allocated as a static object, the routine determines whether the rate at which the object changes is greater than the threshold for identifying the object as a dynamic data object, as shown at step 156. If not, the data object remains a static data object. If the static object is being updated at a rate greater than the threshold for identifying the object as a dynamic data object, the data object is reclassified as a dynamic data object, as shown at step 158.

Similarly, if the data object was previously allocated as a dynamic object, the routine again determines whether the rate at which the object changes is greater than the threshold for identifying the object as a dynamic data object, as shown at step 162. If so, the data object remains a dynamic data object. If the dynamic object is being updated at a rate less than the threshold for identifying the object as a dynamic data object, the data object may be reclassified as a static data object, as shown at step 164. At step 160, if a data object has been reclassified based on the rate at which it has been changed, memory is reallocated for the data object in a manner similar to the original memory allocation as illustrated by FIG. 4.

At step 166, the routine determines whether all of the data objects have been analyzed to determine whether each should be allocated as static or dynamic. If each data object has been analyzed, the routine ends as shown at step 168. If additional data objects need to be analyzed, the routine returns to step 150 and identifies the next data object to be analyzed. The routine is preferably a background routine executing at a periodic interval.

During normal operation of the controller, the time interval between power cycles may be lengthy. As a result, a record of changes may grow to an unmanageable size. Therefore, it is preferable that a routine executing on the processor 30 periodically copy the changes from the log to the base image. The routine may execute periodically as a background task executing on the processor 30. As changes are copied from the log to the base image, the change is cleared from the log and the new values of the static data objects are incorporated into the base image.

After a power loss and as power is restored, the log, along with the base image, is used to return each static data object to its state prior to the power loss. First, the value of each static data object from the base image is copied from non-volatile memory 34 to volatile memory 32. Then, each entry in the log is replayed, from the oldest to the most recent, such that each change that was stored in the log is copied to the volatile memory 32 in the same sequence in which it was originally stored in the log. Optionally, if the log recorded commands sent to the controller, the log is replayed such that the commands are reissued in the order they were received to similarly restore the static data objects in volatile memory to their state prior to power loss.

According to another embodiment of the present invention, changes to static data objects may be tracked by a status flag established for each of the static data objects which are stored in volatile memory 32. The status flag may be, for example, a bit that is selectively toggled between zero and one. The status flag may be stored in the volatile memory 32 along with the data object or, optionally, a separate block of memory may include status flags for each of the data objects. As a new value is received for a static data object, the new value is stored in the volatile memory 32 location and the status flag is set, indicating that the corresponding non-volatile memory 34 location for that data object must be updated. A background routine may be executed to periodically review the status flags for the static data objects and update the non-volatile memory locations for those static data objects that have changed. After updating the non-volatile memory location, the background routine clears the status flag. Upon a power loss, the value of any static data object having the status flag set is copied to non-volatile memory along with the values of the dynamic data objects.

The present method first places data objects into non-volatile memory. Each data object that needs to be accessed at run-time is identified as a static or dynamic object. When data objects are modified, either by the control program or an external interface, the static objects are first updated in the non-volatile memory and then stored in volatile memory while dynamic objects are updated directly in volatile memory. If power to the controller is removed, the present value of each dynamic data object is copied to non-volatile memory. When power to the controller is restored, the values of both the frequently accessed static and the dynamic data objects are copied from non-volatile memory to volatile memory.

Regardless of whether the changes to static data objects are stored directly to the non-volatile memory 34 or a record of changes to the static data objects is maintained, the correlation between the location in the non-volatile memory 34 and the location in the volatile memory 32 for the static data object must be managed. According to a first embodiment of the present invention, the static data objects may be written directly to both volatile and non-volatile memory devices, 32 and 34. A separate routine executing on the processor tracks used and unused memory locations. The routine similarly maintains a record of the corresponding memory addresses for a data object in both volatile and non-volatile memory.

According to another embodiment of the invention, an embedded file system may be stored on the non-volatile memory device 34 for execution on the processor 30. The embedded file system manages the used and unused memory locations and maintains the record of the corresponding memory addresses for a data object in both volatile and non-volatile memory. A separate routine executing on the processor 30 interfaces with the file system to locate and store data objects in the file system.

According to still another embodiment of the present invention, an embedded database may be stored on the non-volatile memory device 34 and is accessible by a routine executing on the processor 30. The embedded database manages the used and unused memory locations and maintains a relational record of the corresponding memory addresses for a data object in both volatile and non-volatile memory, 32 and 34. The relational record may store a first name or address for a data object in the volatile memory, a second name or address corresponding to the data object in non-volatile memory, or any combination of names, addresses, or other descriptors for each data object in volatile and non-volatile memory. A separate routine executing on the processor 30 interfaces with the embedded database to exploit the lookup capabilities of a database to facilitate efficient updates of and inserts to the static data objects.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A method of retaining a plurality of data objects in memory in an industrial controller having both a volatile memory and a non-volatile memory, comprising the steps of:
classifying each of the data objects as a static data object or a dynamic object, wherein each static data object is changed at a frequency less than a preselected threshold frequency and each dynamic object is changed at a frequency greater than a preselected threshold frequency;
storing each static data object in the non-volatile memory;
allocating an address in the volatile memory for each dynamic data object and for at least a portion of the static data objects;
updating the dynamic data object in the volatile memory when each dynamic data object changes;
for the portion of static data objects having the addresses allocated in the volatile memory, tracking the change of the static data object in non-volatile memory and updating the static data object in the volatile memory when the static data object changes, wherein tracking the change of the static data object in non-volatile memory occurs prior to updating the static data object in the volatile memory;
copying a present value of each dynamic object in the volatile memory to the non-volatile memory when power is removed from the controller.

2. The method of claim 1 further comprising the step of copying each of the dynamic data objects and the portion of static data objects stored in the volatile memory from the non-volatile memory to the volatile memory when power is restored to the controller.

3. The method of claim 1 wherein tracking the change of the static data objects stored in volatile memory comprises the step of storing a record of each change into the non-volatile memory.

4. The method of claim 3 further comprising the steps of:
copying each of the dynamic data objects and the portion of static data objects stored in the volatile memory from the non-volatile memory to the volatile memory when power is restored to the controller; and
restoring the changes to the static data objects stored in the volatile memory according to the record of changes.

5. The method of claim 3 further comprising the steps of:
updating the static data objects in non-volatile memory according to the record of changes at a predefined interval; and
clearing the record of changes in non-volatile memory.

6. The method of claim 1 wherein at least one of the data objects further comprises a first data element and a second data element.

7. The method of claim 6 wherein the first data element is classified as a static data object and the second data element is classified as a dynamic data object.

8. The method of claim 1 further comprising the step of reserving a portion of the non-volatile memory equal to or greater in size than number of dynamic data objects.

9. The method of claim 8 wherein the step of copying the present value of each dynamic object in the volatile memory copies each of the dynamic objects to the reserved portion of the non-volatile memory.

10. The method of claim 1 wherein an amount of time exists between the voltage level in the controller dropping from a voltage level indicative of a power loss in the controller and the minimum voltage level required to write to non-volatile memory and wherein the quantity of dynamic data objects copied when power is removed is small enough that the step of copying the present value of each dynamic object is performed without a battery backup within the amount of time.

11. The method of claim 1 wherein a database is embedded in the non-volatile memory device and the embedded database stores the relation between a first address corresponding to each data object in the volatile memory and a second address corresponding to the data object in non-volatile memory.

12. The method of claim 1 wherein a database is embedded in the non-volatile memory device and the embedded database stores the relation between a name corresponding to each data object in the volatile memory and an address corresponding to the data object in non-volatile memory.

13. The method of claim 1 further comprising the steps of:
monitoring the rate at which each dynamic data object and each static data object is updated;
comparing the rate at which each dynamic data object and each static data object is updated against the threshold frequency; and
reclassifying each of the data objects as a static data object or a dynamic object according to the comparison of the rate at which each dynamic data object and each static data object is updated against the threshold frequency.

14. An industrial control system configured to retain a plurality of data objects in memory at power loss, comprising:
a processor executing a control program having a plurality of static data objects and a plurality of dynamic data objects, wherein each static data object is changed at a frequency less than a preselected threshold frequency and each dynamic object is changed at a frequency greater than a preselected threshold frequency;
a non-volatile memory device storing each of the static data objects; and
a volatile memory storing each dynamic data object and at least a portion of the static data objects, wherein the processor executes at least one routine to:
allocate an address in the volatile memory for each of the static data objects stored in the volatile memory,
track the change of the portion of the static data objects by storing the changed data object in the non-volatile memory prior to storing the changed data object in the volatile memory,
store a changed data object from the portion of the static data objects in both the non-volatile and the volatile memory when one of the data objects from the portion of the static data object changes, and
monitor a low voltage signal and wherein, if the low voltage signal is active, the at least one routine copies a present value of each dynamic data object from the volatile memory to the non-volatile memory.

15. The industrial control system of claim 14 wherein the at least one routine executing on the processor copies each of the dynamic data objects and the portion of static data objects stored in volatile memory from the non-volatile memory to the volatile memory when power is restored to the processor.

16. The industrial control system of claim 14 wherein tracking the change of the static data objects is performed by storing a record of each change into the non-volatile memory.

17. The industrial control system of claim 16 wherein the at least one routine executing on the processor copies each of the dynamic data objects and the portion of static data objects stored in volatile memory from the non-volatile memory to the volatile memory when power is restored to the processor and the at least one routine restores the changes to the static data objects stored in the volatile memory according to the record of changes.

18. The industrial control system of claim 14 wherein at least one data object has a first data element classified as static and a second data element classified as dynamic.

19. The industrial control system of claim 14 wherein an amount of time exists between the voltage level in the controller dropping from a voltage level indicative of a power loss in the controller and the minimum voltage level required to write to non-volatile memory and wherein the quantity of dynamic data objects is small enough such that copying the value of the dynamic data objects from the volatile memory to the non-volatile memory is performed without a battery backup within the amount of time.

* * * * *